(12) United States Patent
Hoare et al.

(10) Patent No.: US 10,572,742 B2
(45) Date of Patent: Feb. 25, 2020

(54) SYSTEM FOR USE IN A VEHICLE

(71) Applicant: Jaguar Land Rover Limited, Whitley, Coventry, Warwickshire (GB)

(72) Inventors: Edward Hoare, Malvern (GB); Thuy-Yung Tran, Rugby (GB); Mikhail Cherniakov, Birmingham (GB); Aleksandr Bystrov, Birmingham (GB); Marina Gashinova, Birmigham (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 149 days.

(21) Appl. No.: 15/548,542

(22) PCT Filed: Jan. 29, 2016

(86) PCT No.: PCT/EP2016/051883
§ 371 (c)(1),
(2) Date: Aug. 3, 2017

(87) PCT Pub. No.: WO2016/124487
PCT Pub. Date: Aug. 11, 2016

(65) Prior Publication Data
US 2018/0012081 A1   Jan. 11, 2018

(30) Foreign Application Priority Data
Feb. 3, 2015 (GB) .................. 1501754.4

(51) Int. Cl.
*G06K 9/00* (2006.01)
*G01S 13/89* (2006.01)
*G06N 3/04* (2006.01)

(52) U.S. Cl.
CPC .......... *G06K 9/00791* (2013.01); *G01S 13/89* (2013.01); *G06N 3/0472* (2013.01)

(58) Field of Classification Search
CPC .......... G06K 9/00791; G06K 9/00798; G06N 3/0472; G01S 13/89
See application file for complete search history.

(56) References Cited

U.S. PATENT DOCUMENTS

| | | | | |
|---|---|---|---|---|
| 2004/0201462 | A1* | 10/2004 | Hartlieb | G01S 13/931 340/435 |
| 2007/0139247 | A1* | 6/2007 | Brown | F41H 13/0043 342/13 |
| 2014/0257621 | A1* | 9/2014 | Zych | G01C 21/3453 701/25 |

FOREIGN PATENT DOCUMENTS

| | | |
|---|---|---|
| CN | 101609606 A | 12/2009 |
| EP | 2574958 A1 | 4/2013 |

(Continued)

OTHER PUBLICATIONS

Sadhukhan_Autonomous ground vehicle terrain classification using internal sensors, Master Thesis, Florida State University, Mar. 2004 (Year: 2004).*

(Continued)

*Primary Examiner* — Yuen Wong
(74) *Attorney, Agent, or Firm* — Reising Ethington P.C.

(57) ABSTRACT

A system for use in a vehicle for determining an indication of the type of terrain in the vicinity of the vehicle, the system comprising; means configured to receive sensor output data from at least one sensor on the vehicle; means configured to determine a plurality of parameters in dependence on the sensor output data; a neural network algorithm configured to receive the plurality of parameters; and means configured to execute the neural network algorithm to provide a plurality of outputs corresponding to a plurality of different terrain types, the neural network being further configured to asso- (Continued)

ciate the plurality of parameters with one of the plurality of outputs, so as to determine an indication of the terrain type.

19 Claims, 5 Drawing Sheets

(56) References Cited

FOREIGN PATENT DOCUMENTS

| | | |
|---|---|---|
| GB | 2492655 A | 1/2013 |
| JP | H08138188 A | 5/1996 |

OTHER PUBLICATIONS

Sadhukhan, "Autonomous Ground Vehicle Terrain Classification Using Internal Sensors", Electronic Theses Treatises and Dissertations, Mar. 16, 2004, 70 pages.

Ojeda et al., "Terrain Characterization and Classification with a Mobile Robot", Journal of Field Robotics, vol. 23, No. 2, Jan. 2006, pp. 103-122.

Sung et al., "Neural Network Based Terrain Classification Using Wavelet Features", Journal of intelligent & robotic systems, vol. 59, Issue 3-4 Feb. 13, 2010, pp. 269-281.

Wang et al., "Road Terrain Type Classification based on Laser Measurement System Data", Proceedings of Australasian Conference on Robotics and Automation, Dec. 3-5, 2012, XP055265768, Wellington New Zealand Retrieved from the Internet: URL:http://www.araa.asn.au/acra/acra2012/papers/pap120.pdf [retrieved on Apr. 15, 2016], 6 pages.

Walas et al., "Terrain Classification Using Laser Range Finder", 2014 IEEE/RSJ International Conference on Intelligent Robots and Systems, IEEE, Sep. 14-18, 2014, pp. 5003-5009, XP032676523, DOI: 10.1109/IROS.2014.6943273.

Combined Search and Examination Report for application No. GB1501754.4, dated Jul. 21, 2015, 7 pages.

International Search Report for International application No. PCT/EP2016/051883, dated Jul. 7, 2016, 8 pages.

Written Opinion for International application No. PCT/EP2016/051883, dated Jul. 7, 2016, 11 pages.

N. Kees et al., "Road Surface Classification by Using a Polarimetric Coherent Radar Module at Millimeter Waves", Microwave Symposium Digest, IEEE MTT-S International, dated May 1994, pp. 1675-1678.

European Office Action in English corresponding to European application No. EP 16701819, dated Sep. 11, 2019, 10 pages.

\* cited by examiner

SYSTEM FOR USE IN A VEHICLE

TECHNICAL FIELD

The present disclosure relates to a system for use in a vehicle and particularly, but not exclusively to a system that enables the vehicle to determine an indication of the type of terrain in the vicinity of the vehicle. Aspects of the invention relate to vehicle systems and methods, and to a vehicle.

BACKGROUND

Many modern vehicles are fitted with systems (anti-lock braking, adjustable ride height etc.) designed to improve the riding experience of the users. The riding experience could be a measure of, for example, vehicle composure or comfort. The setup of the systems of a vehicle, such that the riding experience is optimised may be dependent on the type of terrain over which the vehicle travels. Current systems have defined system configurations for a plurality of different terrain types. In a vehicle terrain response system (VTRS), such as Terrain Response (R), the user may determine the terrain type over which the vehicle is travelling, or determine the terrain type ahead of the vehicle, for example visually, and manually input this information into the VTRS which then adjusts the configuration of the systems appropriately. Alternatively, the vehicle may be fitted with sensors designed to measure certain characteristics of vehicle subsystems (such as wheel acceleration, wheel slip, steering force estimator etc.) that are indicative of the terrain type over which the vehicle is travelling. Based on these measurements, the VTRS may determine the terrain type that most likely fits with these characteristics, and adjust the configuration of the systems appropriately, for example as described in published UK patent document GB2492655. However, the determination of a terrain type by examining vehicle parameters using on-board systems is reactive to the terrain over which the vehicle is currently travelling and as such does not allow the vehicle to prepare and/or adopt an appropriate configuration in advance for the terrain over which it is about to travel, without user-input.

Our co-pending UK Patent Application No. 1402389.9 describes a vehicle control system (VCS) in which sensor output data from a plurality of vehicle-mounted sensors may be used to remotely determine the terrain type ahead of the vehicle. This is advantageous because it reduces driver workload, especially when driving off road where conditions can be demanding, and enables the vehicle systems to either automatically prepare for upcoming terrain prior to reaching it, or communicate via a human machine interface (HMI) with the driver controlling the vehicle so that they may be alerted. Such a VCS may also have benefit in automated moving devices (robots, unmanned vehicles, automatic aircraft landing systems etc.) where operator's input may not be available to prepare for the terrain ahead.

As mentioned above, different types of vehicle-mounted sensors may be used to collect sensor output data from the terrain in the vicinity of the vehicle (i.e. the terrain over which the vehicle is travelling and/or ahead of/surrounding the vehicle). The sensor output data may then be used to calculate a plurality of different parameters indicative of the terrain in the vicinity of the vehicle. Generally speaking, the greater the number of different parameters used by the VCS in determining the terrain type, the greater the probability that an accurate determination of terrain type may be made. However, the use of large numbers of different parameters in making a determination of the terrain type is computationally expensive, and therefore present techniques may resort to using a relatively small number of selected parameters only. It is therefore desirable to provide a VCS that can deal with a large number of parameters so as to maximise the probability of a more accurate determination of the terrain in the vicinity of a vehicle is made. The VTRS may then adjust other systems of the vehicle appropriately in order that the vehicle traverses the terrain in an optimal manner, or communicate the determined terrain type to the driver via the HMI.

The collected sensor output data for a particular terrain type may contain a reasonable amount of variation between readings. For example, the sensor output data for grass may vary depending on the length of the grass. The sensor output data may also contain 'outlying' sensor measurements: this may be caused by, for example, objects on the terrain surface. It is therefore desirable to provide a VCS for determining the terrain type in the vicinity of the vehicle that can successfully deal with sensor output data for a particular terrain type containing such variation and outlying sensor measurements in such a way that an accurate determination of the terrain type may still be made. In addition, certain parameters may show greater differences in the sensor output data between different terrain types in different situations, and it is desirable that the VCS could utilise this when determining the terrain type.

One aim of the present invention is to provide a vehicle control system that is configured to process collected sensor output data to identify certain characteristics relating to a particular terrain type and to determine an indication of the terrain type in the vicinity of the vehicle based on these identified characteristics, that addresses the difficulties described above in such a way that the systems in the prior art cannot.

SUMMARY OF THE INVENTION

Aspects and embodiments of the invention provide systems, methods and a vehicle as claimed in the appended claims.

According to an aspect of the invention, there is provided a system for use in a vehicle for determining an indication of the type of terrain in the vicinity of the vehicle, the system comprising means configured to receive sensor output data from at least one sensor on the vehicle and means configured to determine a plurality of parameters in dependence on the sensor output data. In addition, the system includes a neural network algorithm configured to receive the plurality of parameters and means configured to execute the neural network algorithm to provide a plurality of outputs corresponding to a plurality of different terrain types, the neural network being further configured to associate the plurality of parameters with one of the plurality of outputs, so as to determine an indication of the terrain type.

According to another aspect of the invention, there is provided a system for use in a vehicle for determining an indication of the type of terrain in the vicinity of the vehicle, the system comprising means configured to receive sensor output data from at least one sensor on the vehicle, the sensor output data including a reflected radar signal from the terrain in the vicinity of the vehicle, and means configured to determine a plurality of parameters in dependence on the sensor output data. In addition, the system includes a neural network algorithm configured to receive the plurality of parameters and means configured to execute the neural network algorithm to provide a plurality of outputs corresponding to a plurality of different terrain types, the neural network being further configured to associate the plurality of parameters with one of the plurality of outputs, so as to determine an indication of the terrain type.

References to a sensor being "on the vehicle" may include both permanent vehicle mounted sensors or a portable device carried on the vehicle temporarily.

The means configured to receive, to calculate and to execute may comprise an electronic control unit or one or more controllers. For example, said means configured to receive sensor output data from at least one sensor on the vehicle comprises an electronic processor having an electrical input for receiving an electronic signal from said at least one sensor indicative of said sensor output data. The electronic controller, or the one or more controllers may have, associated therewith, micro-processors programmed to execute the required functions. For example, the system may comprise an electronic memory device electrically coupled to the electronic processor and having instructions stored therein. Said means configured to determine a plurality of parameters in dependence on the sensor output data may comprise the processor being configured to access the memory device and execute the instructions stored therein such that it is operable to determine said plurality of parameters in dependence on the sensor output data.

The processor may be configured to access the memory device and execute the instructions stored therein such that it is operable to execute the neural network algorithm in response to the determination of the plurality of parameters, thus providing a plurality of outputs corresponding to a plurality of different terrain types such that the neural network associates the plurality of parameters with one of the plurality of outputs, so as to determine an indication of the terrain type.

In addition the electronic controller, or the one or more controller, may have an internal, or associated external, memory means, for example a solid state memory device. It will be appreciated that all the functional "means" referred to throughout this document may be considered as control functions within one or more electronic control units or controllers.

The system may be used beneficially to determine the terrain type ahead of the vehicle i.e. by analysing sensor output data from sensors receiving a signal reflected from terrain ahead of the vehicle. The use of reflected radar signals may be particularly useful for this purpose, not least because of the range of radar signals and because existing radar sensors on a vehicle may be used. The neural network algorithm advantageously processes a relatively large number of parameters associated with the received sensor output data when determining the particular terrain type, and this allows a more accurate determination of the terrain type to be made.

The system may comprise means for storing a plurality of weighting factors, and wherein the neural network algorithm comprises a plurality of nodes, each one of the weighting factors associated with a corresponding node and each weighting factor being applied to said corresponding node when the neural network algorithm is executed. The means for storing may be the memory device above, or may be a separate memory device. The weighting factors advantageously need a relatively small amount of storage space and are therefore suitable for storage on the vehicle.

The neural network algorithm may be configured to determine a classification probability for each of the plurality of outputs in dependence on the plurality of parameters, and wherein the determination of the terrain type is based on the output with the highest classification probability. Optionally, the neural network algorithm is a Multi-Layer Perceptron algorithm.

In an embodiment, the system comprises means configured to enable communication of the determined terrain type to a driver of the vehicle. This allows the driver to alter his/her driving style and/or alter the setup of the vehicle as appropriate to best suit the particular terrain type. Optionally, the means configured to enable communication is a human machine interface.

The means configured to enable communication may be further configured to enable driver-input of a terrain type following a determination of the terrain type by the driver. Optionally, the system comprises means configured to compare the determined terrain type with the terrain type determined by the driver, as part of a self-learning process. Advantageously, this provides a check for the system and/or allows an override of the system if appropriate. The processor above, or a different processor, may carry out this comparison.

In an embodiment, the system comprises means configured to store the plurality of parameters together with the corresponding determined terrain type and/or the terrain type determined by the driver, as part of a self-learning process. The storing means may be one of the memory devices above. Alternatively, the storing means may be a different memory device. The system may comprise means, possibly in the form of a processor, that is configured to adjust one or more of the weighting factors applied to the nodes of the neural network algorithm in dependence on the plurality of parameters, and/or one or both of the determined terrain type and the terrain type determined by the driver, as part of a self-learning process. This updating of the values of the weighting factors is in order to improve the accuracy of the neural network algorithm (i.e. to increase the likelihood of a particular terrain type being correctly identified). Hence the performance of the system may be improved over time.

The system may comprise means configured to send the plurality of parameters, and/or one or both of the determined terrain type and the terrain type determined by the driver, to a manufacturer of the vehicle. This may be achieved via over-the-air updates, possibly utilising a phone network, the Internet, or WiFi.

In an embodiment, the system comprises means configured to send a control signal to one or more vehicle systems or subsystems to automatically adjust the setup of at least one vehicle system or subsystem in dependence on the determined terrain type. The signal may be sent by a controller of the system, or perhaps by a controller of another system such as a vehicle terrain response system.

The means configured to receive may be configured to receive the sensor output data in real time, which would advantageously allow the system to respond automatically to the determination of a particular terrain type in time for the setup of the vehicle to be suitably adjusted perhaps before the vehicle reaches the terrain.

The means configured to receive may be configured to receive the reflected radar signal from the terrain in the vicinity of the vehicle at a plurality of radar signal frequencies.

The receiving means may include a pair of receiving antennas at orthogonal polarisations for receiving the reflected radar signal.

The reflected radar signal may be recorded by a Vector Network Analyser.

The receiving means may be configured to receive sensor output data in the form of at least one of:

a received horizontally polarised signal representative of power in a received horizontal polarisation component of the radar signal reflected from the terrain in the vicinity of the vehicle;

a received vertically polarised signal representative of power in a received vertical polarisation component of the radar signal reflected from the terrain in the vicinity of the vehicle;

the power of a received clockwise-rotating elliptically polarised signal of the radar signal reflected from the terrain in the vicinity of the vehicle; and the power of a received anticlockwise-rotating elliptically polarised signal of the radar signal reflected from the terrain in the vicinity of the vehicle.

The plurality of determined parameters may include at least one of an average of the horizontal polarisation signal power, an average of the vertical polarisation signal power, and an average of the cross polarisation signal power.

The plurality of determined parameters may include at least one of a horizontal polarisation signal standard deviation, a vertical polarisation component standard deviation, and a cross polarisation signal standard deviation, a vertical polarisation component standard deviation.

The plurality of determined parameters includes at least one of a duration of the horizontal polarisation signal power above a defined horizontal power threshold, a duration of the vertical polarisation signal power above a defined vertical power threshold, and a duration of the cross polarisation signal power above a defined vertical power threshold.

The plurality of determined parameters includes at least one of a ratio of any two of: the horizontal polarisation power signal; the vertical polarisation power signal; and, the cross polarisation power signal.

The plurality of determined parameters includes at least one of the horizontal polarisation power signal, the vertical polarisation power signal, and the cross polarisation power signal from a fixed area of terrain ahead of the vehicle.

Alternatively, or in addition, the means configured to receive may be configured to receive sensor output data in the form of a reflected acoustic signal from the terrain in the vicinity of the vehicle at one or more acoustic signal frequencies. Receiving signal output data from different kinds of sensors and/or at different frequencies increases the number of independent parameters that may be used as input to the neural network algorithm, thereby increasing the probability of a correct determination of the terrain type.

The plurality of determined parameters may include at least one of a ratio of the acoustic power signal and one of the horizontal polarisation power signal, the vertical polarisation power signal, and the cross polarisation power signal.

The plurality of determined parameters may include the acoustic power signal from a fixed area of terrain ahead of the vehicle.

Signals from at least one other type of sensor such as a wheel speed sensor, tyre pressure sensor, vehicle speed sensor, brake pedal position sensor, suspension articulation sensor, acceleration sensor, wheel slip sensor, pitch rate sensor, and yaw rate sensor may be received by the receiving means.

In another aspect of the present invention there is provided a system for calibrating a neural network algorithm for use in determining an indication of a type of terrain in the vicinity of a vehicle, the system comprising means configured to store a plurality of sets of sensor output data, wherein each set of sensor output data corresponds to a known particular terrain type; and means configured to determine one or more parameter sets, wherein each parameter set comprises a plurality of parameters calculated in dependence on one of the sets of sensor output data. The system also comprises a neural network algorithm comprising a plurality of nodes, wherein the neural network algorithm is configured to receive the one or more parameter sets and to provide a plurality of outputs corresponding to a plurality of different terrain types, and means configured to apply each of a plurality of weighting factors to a corresponding one of the nodes when the neural network algorithm is executed. In addition, the system includes means configured to adjust the value of at least one of the weighting factors in order that, when executed, the neural network algorithm associates the parameter set for each set of sensor output data with the output corresponding to the known particular terrain type, so that a correct indication of the terrain type is determined; and means configured to store the adjusted weighting factors as part of the neural network algorithm for the purpose of calibration.

There may be provided an electronic memory device electrically coupled to the electronic processor, the electronic memory having instructions, the sensor output data and the adjusted weighting factors stored therein, and the means configured to determine, the means configured to apply and the means configured to adjust comprise an electronic processor which may be configured to access the memory device and execute the instructions stored therein such that it is operable to determine the one or more parameter sets, to execute the neural network algorithm and to adjust the weighting factors, so as to calibrate the neural network algorithm.

This calibration system may be computationally more expensive and need a greater amount of storage than the operational system, and so this calibration system may advantageously not be carried on the vehicle, thereby reducing expense.

The sensor output data may comprise empirically-gathered data and/or a standardised data set.

According to another aspect of the invention, there is provided a system for use in a vehicle for determining an indication of the type of terrain ahead of the vehicle, the system comprising means configured to receive sensor output data from at least one sensor on the vehicle, the sensor output data including a reflected radar signal from the terrain in the vicinity of the vehicle, and means configured to determine a plurality of parameters in dependence on the sensor output data. In addition, the system includes a neural network algorithm configured to receive the plurality of parameters and means configured to execute the neural network algorithm to provide a plurality of outputs corresponding to a plurality of different terrain types, the neural network being further configured to associate the plurality of parameters with one of the plurality of outputs, so as to determine an indication of the terrain type.

According to another aspect of the present invention there is provided a method for use in a vehicle for determining an indication of the type of terrain in the vicinity of the vehicle, the method comprising receiving sensor output data from at least one sensor on the vehicle, calculating a plurality of parameters in dependence on the sensor output data, and receiving the plurality of parameters into a neural network algorithm. The method also comprises executing the neural network algorithm to provide a plurality of outputs corresponding to a plurality of different terrain types, the neural network associating the plurality of parameters with one of the plurality of outputs, so as to determine an indication of the terrain type.

According to yet another aspect of the present invention there is provided a method for calibrating a neural network algorithm for use in determining an indication of a type of terrain in the vicinity of a vehicle, the method comprising storing a plurality of sets of sensor output data, wherein each set of sensor output data corresponds to a known particular terrain type, calculating one or more parameter sets, wherein each parameter set comprises a plurality of parameters calculated in dependence on one of the sets of sensor output data, and receiving the one or more parameter sets into a neural network algorithm that comprises a plurality of nodes, and providing a plurality of outputs from the neural network algorithm corresponding to a plurality of different terrain types. The method also comprises applying a plurality of weighting factors to a corresponding node when the neural network is executed, adjusting the value of at least one of the weighting factors in order that, when executed, the neural network algorithm associates the parameter set for each set of sensor output data with the output corresponding to the known particular terrain type, so that a correct indication of the terrain type is determined, and storing the adjusted weights for coding into the neural network algorithm, or retrieval by the neural network, when the neural network algorithm is in use in determining an indication of the terrain type.

According to another aspect of the present invention there is provided a non-transitory, computer-readable storage medium storing instructions thereon that when executed by one or more electronic processors causes the one or more electronic processors to carry out any of the above-disclosed methods.

According to another aspect of the invention there is provided a vehicle comprising any of the above-disclosed systems.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying figures, in which.

DETAILED DESCRIPTION

In an embodiment of the invention, sensor output data relating to the terrain ahead of a vehicle is collected from at least one type of sensor on a vehicle, the sensor output data being used to calculate a plurality of different parameters.

Figure 1:
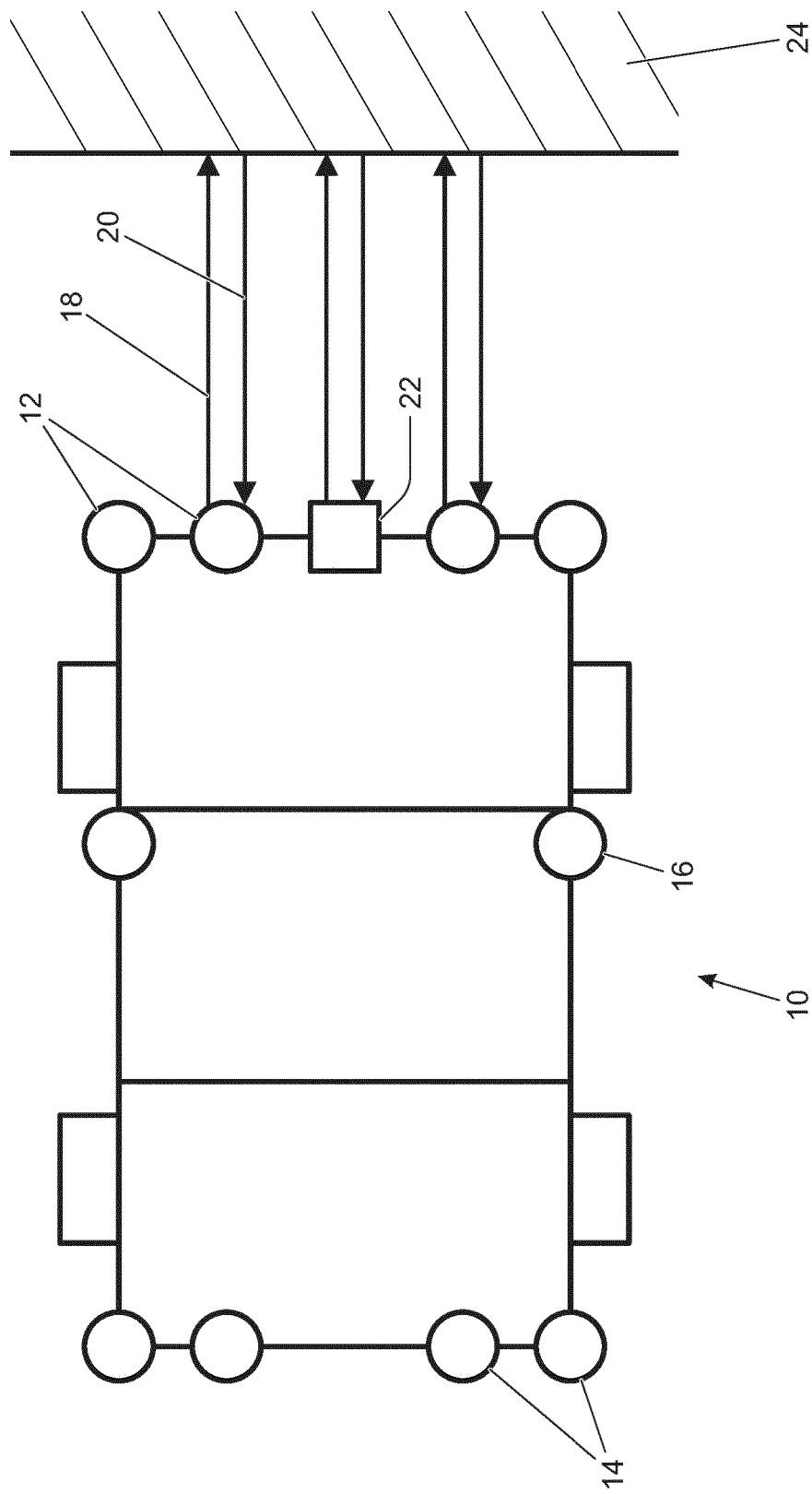
FIG. 1 is an overhead view of a vehicle and of terrain ahead of the vehicle.

FIG. 1 shows one embodiment of a vehicle 10 with two different types of sensors that collect data to be input to different systems of the vehicle. In current systems, there may be acoustic sensors 12, 14, 16 positioned at the front, rear and/or side of the vehicle 10: commonly, acoustic sensors are used to send and receive acoustic signals to collect sensor output data to be input to, for example, parking assistance systems of the vehicle.

Typically, parking assistance systems are used to warn a vehicle user, either by visual or audible means, of the vehicle's proximity to an obstacle. In the case of an audible warning, a warning tone may sound with increasing frequency as the obstacle becomes closer to the vehicle. The acoustic sensors used for parking assistance systems are typically able to detect obstacles at short-range (0.25-1.5 metres) but at a wide angle from the direction in which the sensor is pointed. The parking assistance system may transmit acoustic pulses 18 and then receive back any reflected signal 20 from an obstacle, which may then be processed to calculate the distance between the vehicle and the obstacle.

Also in current systems, there may be a radar sensor 22 positioned at the front of the vehicle 10: commonly, radar sensors are used to send and receive radar signals to collect sensor output data to be input to, for example, adaptive cruise control (ACC) systems. In an ACC system, the time between a radar signal being sent and then received back is measured, and then the distance to a vehicle in front is calculated. This information is sent to other systems of the vehicle (throttle control, brake control etc.) and the necessary action is taken to maintain a constant distance to the vehicle in front. The radar sensors in an ACC system are typically able to detect an obstacle up to about 150 metres in front of the vehicle but at a narrow angle from the direction in which the sensor is pointed; other ACC systems may use shorter range wider angle radars, or a combination of both.

Radar sensors may be positioned at other locations on the vehicle to collect sensor output data to be input to, for example, blind spot detection (BSD) systems or lane departure warning systems (none of which are shown).

FIG. 1 also shows the terrain 24 ahead of the vehicle.

Figure 2:
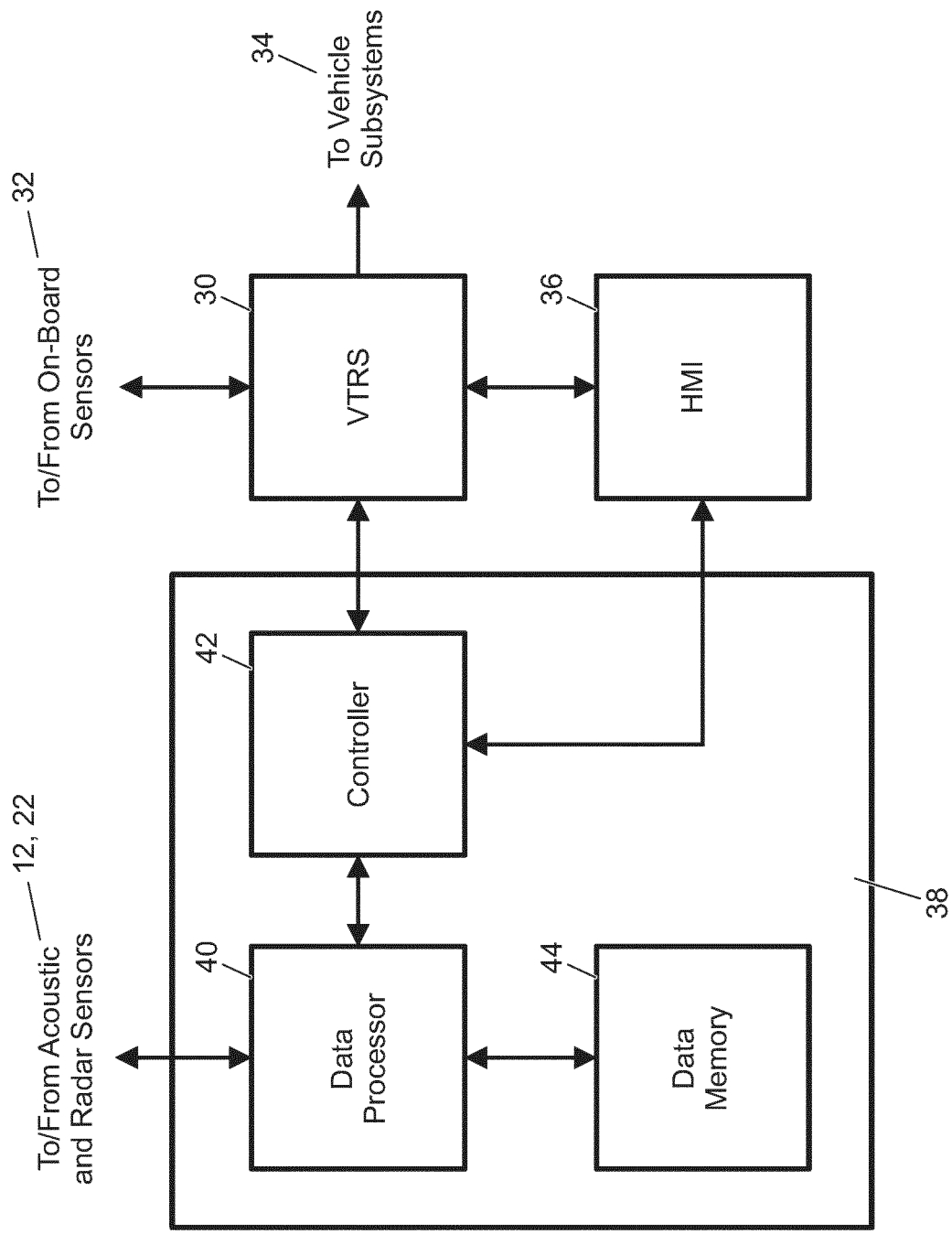
FIG. 2 is a diagram showing the component parts of a vehicle control system (VCS), together with the inputs to, and outputs from, the VCS.

Referring to FIG. 2, in some current vehicles a vehicle system is configured to improve the riding experience of the vehicle user; for example, a vehicle control system (VCS) in the form of a vehicle terrain response system (VTRS) 30, such as a Terrain Response (R) system, receives sensor output data from one or more on-board sensors 32 (such as a wheel speed sensor, tyre pressure sensor, vehicle speed sensor, brake pedal position sensor, suspension articulation sensor, acceleration sensor, wheel slip sensor, pitch rate sensor, and yaw rate sensor) relating to the terrain over which the vehicle 10 is travelling, processes the sensor output data using a processor of the VTRS 30, and automatically sends control signals via a controller of the VTRS 30 to one or more vehicle subsystems 34 (such as a suspension system, traction-control system, stability-control system, engine torque system, or ride height system) so as to allow adjustment of the setup of the vehicle 10 accordingly.

The controller of the VTRS 30 also communicates with a human machine interface (HMI) 36 which incorporates a display. Via the HMI display, the vehicle driver receives alerts or advice, relating to a host of vehicle systems, for example, satellite navigation or in-vehicle entertainment systems. The HMI 36 typically includes a touch-screen keyboard, dial, or voice activation to enable user selection of a particular input for the various vehicle systems which can be controlled. In response to a driver-input via the HMI 36, a control signal is sent via the controller of the VTRS 30 to the one or more vehicle subsystems 34 to adjust the vehicle setup, according to the terrain type over which the vehicle 10 is travelling.

The VTRS 30 may also send alerts to the vehicle driver, via the HMI 36, to adjust his/her driving style (for example, to reduce the vehicle speed), according to the terrain type over which the vehicle 10 is travelling. Details of how the setup may be adjusted via the VTRS 30 are described in our published UK patent document GB2492655.

In addition, the vehicle 10 includes a separate VCS 38 that comprises; a data processor 40 that receives sensor output data from the acoustic and radar sensors 12, 22; a controller 42 for sending signals to, and receiving signals from, the HMI 36 and/or the VTRS 30; and a data memory 44 for storing data to be used by the data processor 40, as is described in greater detail below.

The VCS 38 determines an indication of the terrain ahead of the vehicle 10 using a plurality of different parameters relating to characteristics of the target terrain, the parameters being calculated using the sensor output data that is collected in real-time from the acoustic and radar sensors 12, 22. The controller 42 then sends a control signal to either the VTRS 30 to adjust the vehicle setup accordingly, or to the HMI 36 to prompt the user to input the determined terrain type to the VTRS 30. Here and throughout, the term "determine" should be interpreted to mean "makes a best estimation of".

In more detail, the data processor 40 of the VCS 38 receives sensor output data from both the acoustic and radar sensors 12, 22. The data processor 40 is responsible for associating the received sensor output data to a particular terrain type. The data memory 44 stores pre-determined information which is retrieved by the data processor 40 and then used to help determine to which terrain type a given set of sensor output data relates. Upon determination of the terrain, the data processor 40 communicates with the controller 42, which is responsible for sending control signals relating to the determined terrain type to the HMI 36 and/or VTRS 30. It will be appreciated that, although the processor 40 and controller 42 are shown as independent components, they may comprise a single electronic controller.

Figure 3:
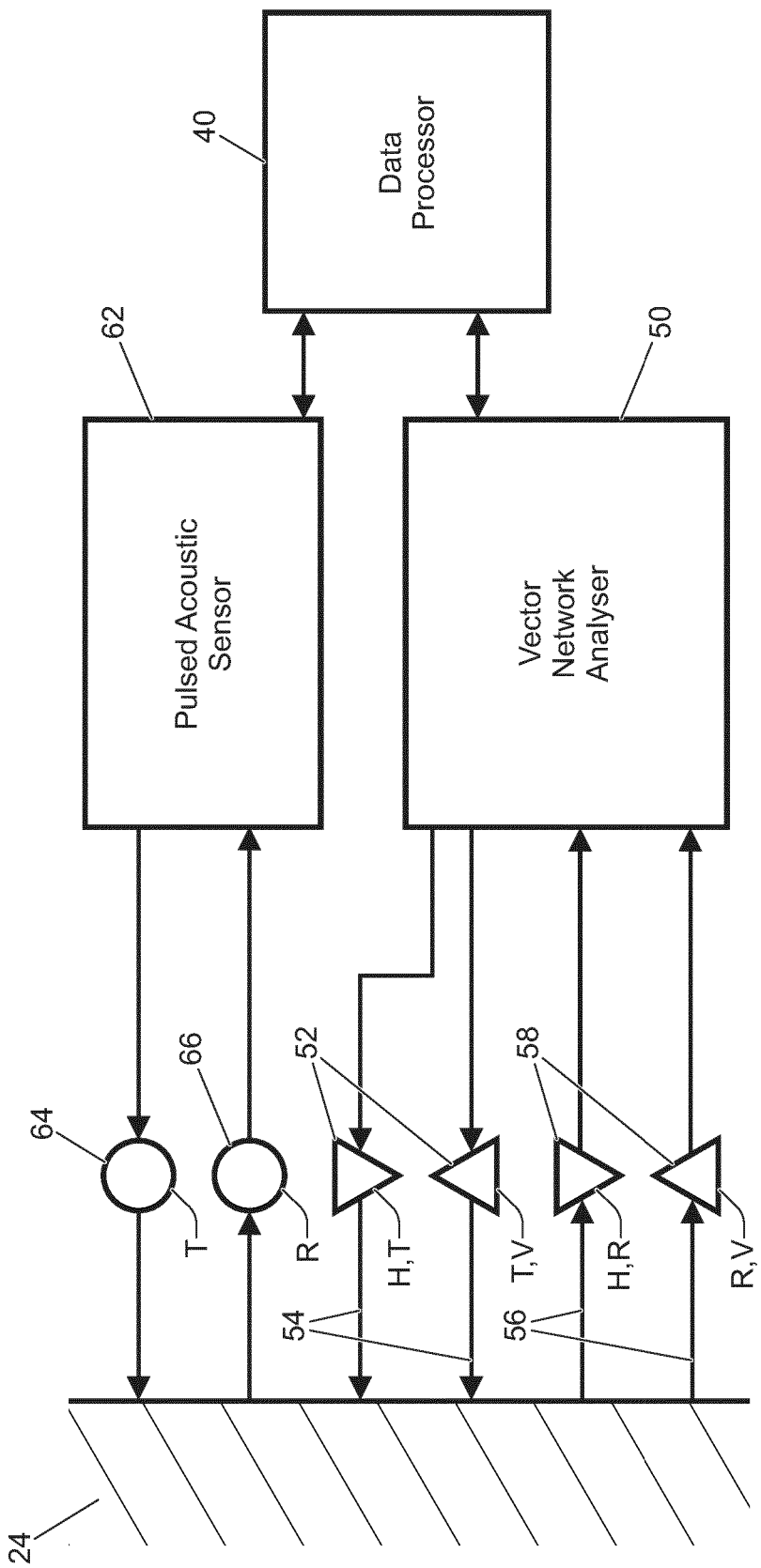
FIG. 3 is a diagram showing acoustic and radar sensors of the vehicle in FIG. 1 and means for processing sensor output data from those sensors.

FIG. 3 is a diagram showing the acoustic and radar sensors 12, 22 of the vehicle 10 shown in FIG. 1, and the data processor 40 for processing sensor output data from those sensors. In the described embodiment, both the radar and acoustic sensors 12, 22 are used to collect sensor output data relating to the terrain ahead of the vehicle 10. Sensor output data from both radar and acoustic sensors is used because data from one type of sensor may be advantageous over the other in certain situations (i.e. it may provide greater distinction between particular types of terrain).

In the described embodiment, the radar signals are generated by a Vector Network Analyser (VNA) 50, transmitted at parallel and/or orthogonal (in particular, horizontal and vertical) polarisations by a pair of transmitting antennas 52, reflected by the terrain 24 ahead of the vehicle (which alters the polarisation of the transmitted signals 54), and then the backscattered signals 56 are collected by a pair of receiving antennas 58 at orthogonal polarisations. Note that the VNA 50 is used in the experimental stage and may be replaced with a dedicated hardware sensor on the vehicle 10. Note also that the radar sensors may be arranged to receive signals reflected from the terrain anywhere in the vicinity of the vehicle 10 (and, in particular, not just ahead of the vehicle 10). The radar sensor units may form part of the vehicle ACC system because of the similar operation and structure of the sensor units required for both purposes.

The radar sensors 22 may be used to characterise, for example, the roughness, wave absorption, or polarisation properties of a given terrain type and, in particular, may be used to detect an area of low friction caused by, for example, water, ice, or wet grass. The roughness of a given terrain type may be characterised using radar signals by analysing the backscattering properties of the wave at different polarisations. In particular, the absolute measured values include: the vertical polarisation signal power, that is the power of a received vertically polarised signal from a vertically polarised transmitter; the horizontal polarisation signal power, that is the power of a received horizontally polarised signal from a horizontally polarised transmitter; and the cross polarisation signal power, that is the power of a received horizontally polarised signal from a vertically polarised transmitter, or vice versa. The reflection of the radar signal from the terrain causes some changes to the polarisation to produce some horizontal component from a vertically polarised transmitted signal. In this way, a measure is made of the amount of the signal power of one polarisation that has had its polarisation shifted.

The transmitting antennas 52 may be further configured to generate an elliptically polarised signal. This may be achieved by transmitting the same signal with vertical polarisation and horizontal polarisation delayed in phase by a quarter wavelength. If the signals have the same power then the generated elliptically polarised signal is a circularly polarised signal, a circularly polarised signal simply being a special case of an elliptically polarised signal.

An elliptically (or circularly) polarised signal may be generated to rotate in either a clockwise or an anticlockwise direction, depending on how the transmitting antennas 52 are arranged. A transmitting antenna capable of transmitting both clockwise and anticlockwise signals generally comprises one vertical antenna sandwiched between two horizontal antennas (or vice versa) and each separated by a quarter wavelength. In this case, a further absolute measured value could be the power of a received anticlockwise-rotating elliptically polarised signal from a clockwise-rotating elliptically polarised signal (or vice versa), and this is referred to as the cross polarisation signal power. Note from above that "cross polarisation" may refer to either a received horizontal (or vertical) signal from a transmitted vertical (or horizontal) signal or a received clockwise- (or anticlockwise-) rotating signal from a transmitted anticlockwise- (or clockwise-) rotating signal. Similarly to above, the reflection from the terrain can alter the polarisation of a clockwise- (or anticlockwise-) rotating elliptically polarised signal to produce an anticlockwise- (or clockwise-) rotating component.

The radar signals 54, 56 may be transmitted and received at a plurality of different frequencies; however, for example, in the automotive industry the currently licensed bands for short-range radar are restricted to 21.65-26.65 GHz and 76-81 GHz. Note that other unlicensed frequency bands may also be considered. In an embodiment, the radar signal may be within microwave range.

The amplitude and phase of the received signals 56 are recorded by the VNA 50. These are then processed to obtain, for example, average signal powers, or reflection from a fixed area of terrain ahead of the vehicle. Relative signal powers are analysed because they are less affected by transmitter power and distance than absolute values. Relative parameters include (but are not restricted to): the ratio of the vertical polarisation signal power to the horizontal polarisation signal power; the ratio of the horizontal polarisation signal power to the vertical polarisation signal power; and the ratio of the cross polarised signal power to the horizontal polarisation signal power. Note that absolute values of signal power can also be used to provide extra data.

The above description provides examples of the parameters that may be calculated from the signals received from the radar sensors 22 that are then to be used by the data processor 40 in determining a particular type of terrain. Further examples of parameters that may be used by the data processor 40 from the received radar signals are given below. The parameters given in the appended list are examples of possible parameters only, and this list is not intended to be exhaustive.

In the described embodiment, the acoustic signals are sent by a pulsed acoustic sensor 62 through a transmitting antenna 64 and the backscattered signal, received through a receiving antenna 66, is measured for energy, duration, range and/or another property of the signal by the pulsed acoustic sensor 62. The data processor 40 processes the received signal to, for example; appropriately scale the signal, to account for path loss, to average the signal in time, and/or to compare against signals in different conditions (such as different weather conditions). The pulsed acoustic sensor 62 may also measure the relative backscattered signals from several range cells over the range of the transmitted signal then analyse the characteristics of the different cells. In other words, the relative backscattered signals can be gated in time to provide swathes of data to be analysed. Note that, similarly to the radar sensors, the acoustic sensors may be arranged to receive signals reflected from the terrain anywhere in the vicinity of the vehicle 10 (and, in particular, not just ahead of the vehicle 10).

The acoustic sensor units may form part of the vehicle parking assistance system because of the similar operation and structure of the sensor units required for both purposes. The acoustic sensor may be used to characterise the, for example, roughness, texture, or sound absorption of a given terrain type. The acoustic sensor may also be used to measure the relative backscattered signals from several range cells over the range extent of the sensor beam and analyse the characteristics of the relative levels. The optimum frequency in terms of cost and attenuation through the atmosphere is in the region of 40-50 kHz, and acoustic sensors on current vehicles operate at typically 51.2 kHz; however, any other suitable frequency may be used. In an embodiment, the acoustic sensor may be sonar.

Similarly to the discussion relating to the received radar signals, the description above provides examples of the parameters that may be calculated from the signals received from the acoustic sensors 12 that are then to be used by the data processor 40 in determining a particular type of terrain. Further examples of parameters that may be used by the data processor 40 from the received acoustic signals are also given below. Also listed are examples of parameters that may be calculated by combining the received radar and acoustic signals. As mentioned above, the parameters given in the appended list are examples of possible parameters only, and this list is not intended to be exhaustive.

The operation of the processor 40 in determining a particular terrain type using the sensor output data from the acoustic and radar sensors 12, 22 is now described in greater detail. In particular, the processor 40 uses a neural network (NN) algorithm to determine an indication of the terrain type. For example, the NN algorithm may be a Multi-Layer Perceptron (MLP) NN model. Alternatively, any other suitable artificial NN model may be used. The MLP model comprises multiple layers of nodes (or perceptrons) in a multidimensional matrix, with each layer connected to nodes in the next layer. A weighting factor (or simply a 'weight') is applied to each node in order to maximise the probability of correct terrain classification by the NN algorithm, as is discussed below.

The inputs to the NN algorithm are the parameter values calculated using the sensor output data (also referred to as a parameter set) from the acoustic and radar sensors 12, 22 described above (and listed below). The outputs from the NN algorithm are the possible terrain types ahead of the vehicle 10. When executed, the NN algorithm determines a value relating to the probability of correct classification for each of the outputs (i.e. terrain types) in dependence on a given set of input parameter values. In other words, the NN algorithm maps sets of input parameters (that are based on collected sensor output data) onto a set of appropriate outputs, where each output represents a different terrain type. The output with the highest value relating to the probability of correct classification represents the determined indication of terrain type ahead of the vehicle 10.

Figure 4:
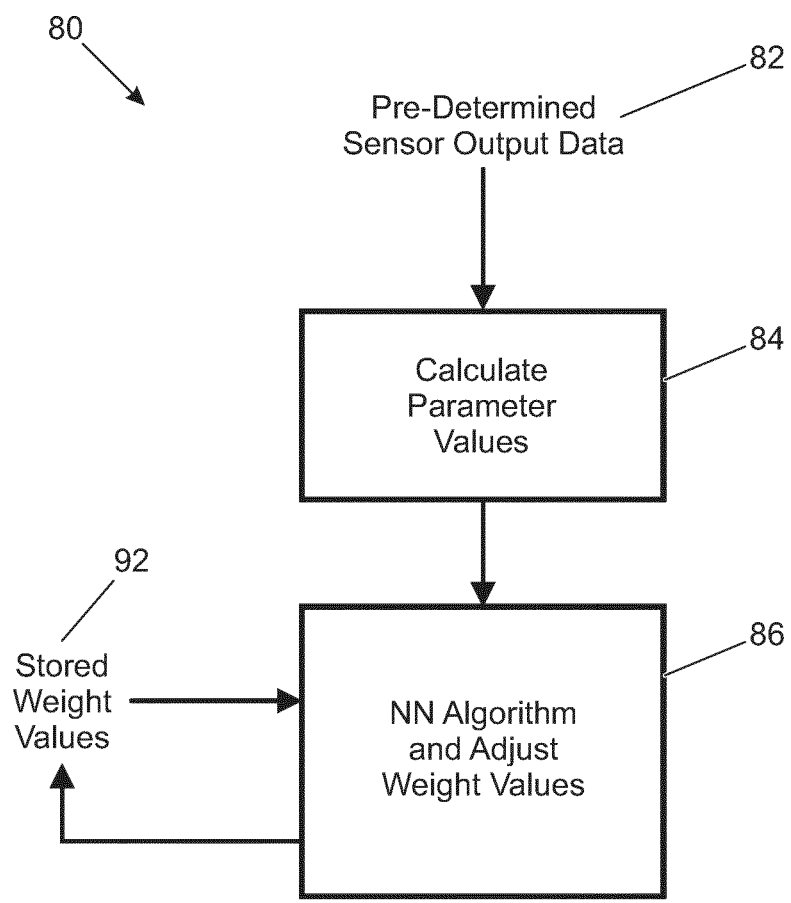
FIG. 4 is a flow diagram which illustrates a process according to an embodiment of the invention for calibrating a neural network algorithm, which is to be used to associate the sensor output data relating to the terrain ahead of the vehicle in FIG. 1 with a particular terrain type.

The MLP model uses a supervised learning technique referred to as 'back projection' for calibrating or training the network. At the point of vehicle manufacture, the VCS 38 undergoes a calibration phase 80 (also referred to as a training phase), the steps of which are shown in FIG. 4. In particular, the weights applied to each node of the NN algorithm are unknown a priori. The purpose of the calibration phase 80 is to determine the values of the weights that should be applied to each node. Therefore, at the calibration phase 80 pre-determined sets of sensor output data in which the inputs and the outputs of the NN algorithm are used. Expressed differently, pre-determined sensor output data (that is, sensor output data relating to a known terrain type) obtained from offline measurements is used to calibrate the NN algorithm (i.e. to determine the values of the weights at each node of the NN algorithm). The pre-determined sensor output data may be part of a standardised data set and/or may include empirically-gathered data.

With reference to FIG. 4, the pre-determined sensor output data 82 is used to calculate values of all the possible parameters (for example, those listed below) at step 84. Each determined parameter value is a separate input to the NN algorithm. At the start of the calibration phase 80, each weight in the NN algorithm 86 may have a default value stored in memory 92. These default values are adjusted at step 86 so that the calculated parameter values 84 that are input to the NN algorithm are mapped through the nodes of each layer of the NN algorithm such that the output corresponds to the 'correct' terrain type (i.e. to the terrain type with which the pre-determined sensor output data 82 is associated). There may be any number of possible outputs depending on the number of possible terrain types. For example, there may be four possible outputs (i.e. terrain types) from the NN algorithm (e.g. grass, gravel, snow, asphalt). The values of the adjusted weights used by the NN algorithm at step 86 are stored in memory 92, where the values of the adjusted weights are such that the inputs relating to the pre-determined sensor output data 82 are mapped to the correct output. These stored weight values 92 are then the starting values used by the NN algorithm when executing the NN algorithm at step 86 for the next set of pre-determined sensor output data 82.

This calibration process 80 is repeated for several different sets of pre-determined sensor output data 82 until the system has been calibrated i.e. until the stored weight values 92 have been adjusted to an extent where the NN algorithm may make a determination of a particular terrain type with an acceptable level of accuracy. In other words, the calibration phase 80 is for identifying the optimum pathways (generally referred to as the 'hidden layer' in neural networks) from the sensor output data through the weighted nodes in the NN algorithm for each terrain type. For example, at least 100 sets of pre-determined sensor output data 82 relating to each terrain type may be used during the calibration phase 80.

The calibration phase 80 may take place using hardware on the vehicle 10, but more likely the VCS 38 will be incorporated onto the vehicle 10 after the NN algorithm has been calibrated so that the calibration phase 80 is carried out externally to the vehicle 10.

Figure 5:
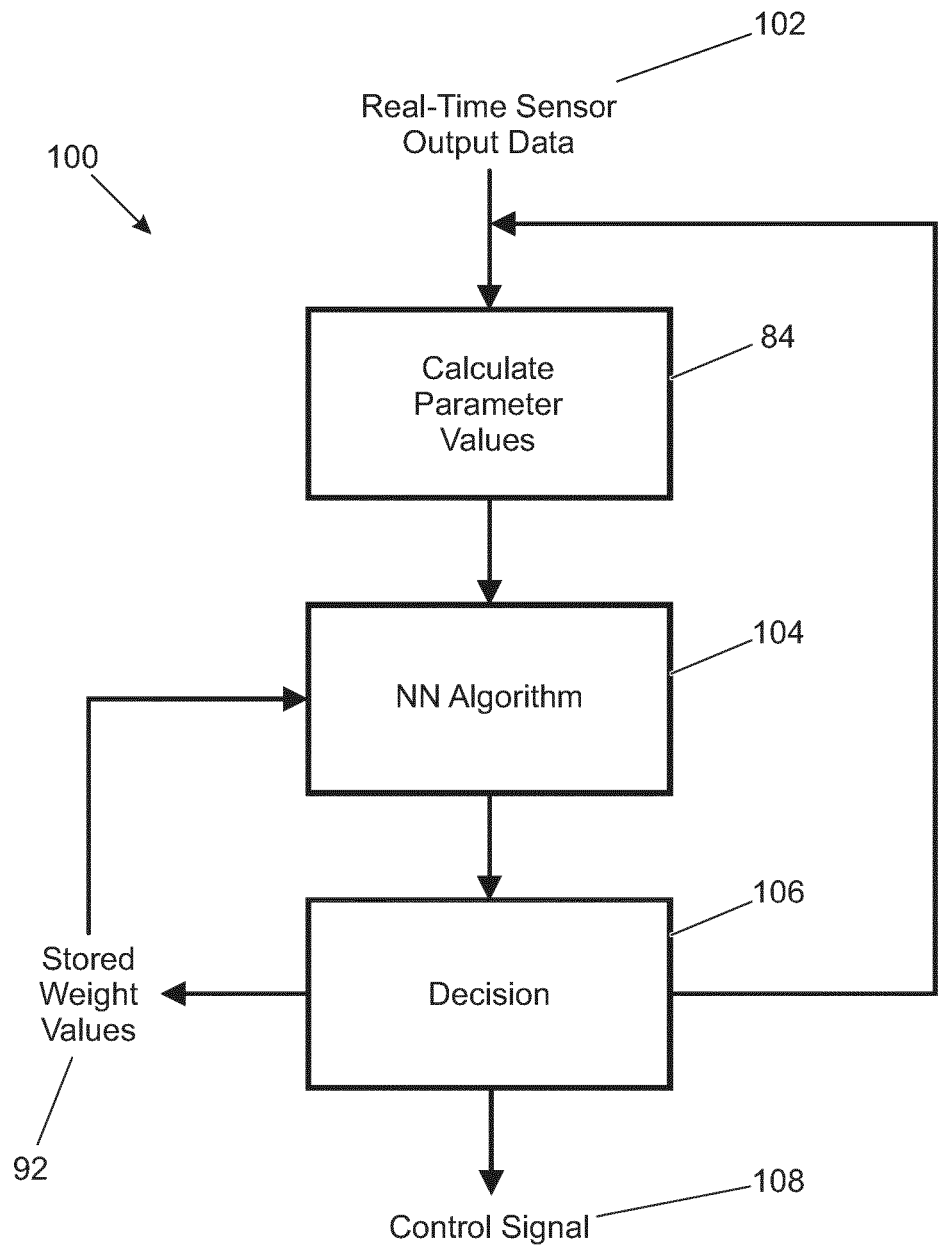
FIG. 5 is a flow diagram which illustrates a process according to an embodiment of the invention for associating the sensor output data relating to the terrain ahead of the vehicle in FIG. 1 with a particular terrain type using the calibrated neural network of FIG. 4.

When the vehicle 10 is in use, the VCS 38 operates in an operational phase 100, the steps of which are shown in FIG. 5. In particular, during the operational phase 100 the weights applied to each node of the NN algorithm are known a priori from the calibration phase 80 (i.e. the final stored adjusted weight values 92), but the terrain type associated with a given set of sensor output data that is collected in real time is unknown. The purpose of the operational phase 100 is to determine the terrain type associated with each set of sensor output data that is collected in real time using the acoustic and radar sensors 12, 22 on the vehicle 10.

With reference to FIG. 5, the real-time sensor output data 102 is used by the processor 40 to calculate values of all the possible parameters listed below at step 84 (i.e. in the same manner as in the calibration phase 80). Also as in the calibration phase 80, each calculated parameter value is an input to the NN algorithm, which is executed at step 104. The processor 40 also retrieves the stored weight values 92 (calculated during the calibration phase 80) from the data memory 44, and these are used by the processor 40 to execute the NN algorithm at step 104. Alternatively, the weight values determined during the calibration phase 80 may simply be coded into the NN algorithm in order to calibrate the NN algorithm for use in the operational phase 100. Even though all of the calculated parameters 84 are input to the NN algorithm, the most significant parameters (i.e. those which provide the greatest distinction between different terrain types/the strongest indication of a particular terrain type) have the optimum weighting factors which results in the best pathway through the layers of the NN algorithm being mapped to the most appropriate output at step 104. The NN algorithm associates the real-time sensor output data 102 to a particular terrain type, and outputs the result with the highest classification probability at step 106 (i.e. the NN algorithm defines the calculated parameters 84 to a particular output).

At the decision step 106, the data processor 40 compares the terrain type determined by the NN algorithm to the terrain type for which the vehicle 10 is currently set up to travel over. If the determined terrain type is the same as the current terrain type then the system simply loops back to the start of the operational phase 100 to analyse the next set of real-time sensor output data 102 from the acoustic and radar sensors 12, 22. If the determined terrain type is different to the current terrain type then the data processor 40 communicates with the controller 42 to send a control signal 108 to either the HMI 36 or directly to the VTRS 30 as described above, and then the system loops back to the start of the operational phase 100 to analyse the next set of real-time sensor output data 102 from the acoustic and radar sensors 12, 22.

It is noted that the calibration phase 80 described above is relatively computationally expensive; however, this phase is likely to be undertaken before the point-of-sale of the vehicle 10. The (relatively expensive) hardware needed for the relatively high computational power usage of the calibration phase 80 need not be located on the vehicle 10. Similarly, the relatively large amount of data memory that is needed for the calibration phase 80 in order to store all of the pre-determined sensor output data 82 and/or the associated parameter values 84 need not be located on the vehicle 10. Instead, in an embodiment the data memory 44 of VCS 38 only needs to store the determined weights for use by the NN algorithm at step 104 of the operational phase 100.

In a further embodiment, the sensor output data from the acoustic and radar sensors 12, 22 may be used in conjunction with the sensor output data from the on-board sensors 32 while accounting for the spatial and/or temporal disparity between sensors receiving data relating to terrain ahead of the vehicle 10 and sensors receiving data relating to terrain over which the vehicle 10 is travelling (if a combination of the two is being used). For example, a time delay would be introduced based on the vehicle speed to pair sensor output data from the acoustic and radar sensors 12, 22 to the automatically determined terrain type (determined using the on-board sensors 32).

In addition, in the case where the controller 42 communicates with the HMI 36 to prompt the user to input the determined terrain type to the VTRS 30, if the user overrides the determined terrain type communicated by the controller 42 and in fact inputs a different terrain type to the VTRS 30 (i.e. when, upon comparison, the terrain type determined by the NN algorithm and the terrain type determined by the driver are found to be different), then the real-time sensor output data (from the radar sensors, acoustic sensors and/or other types of sensors) that the determination was based on may be stored in the data memory 44 and reported back to the manufacturer and/or used to update the stored weights for use in the NN algorithm at step 104, as part of a self-learning process. In addition, or alternatively, the plurality of parameters calculated from the real-time sensor output data, the indication of the terrain type determined by the NN algorithm, and/or the driver-determined terrain type may be sent to the manufacturer and/or used to update the stored weights. This is beneficial because there may be certain values of sensor output data for which it is difficult to make a positive determination based on pre-determined weights that are not particular to the specific geographic location in which the vehicle is normally used.

Also, the use of driver allocated terrain types could better define the NN weights for the specific location in which the vehicle is being driven and result in more accurate future system performance. Note that this driver over-ride approach may also be used in the case where the controller 42 communicates directly with the VTRS 30 to automatically adjust the vehicle setup. Also, if a new terrain type (i.e. one which is not an output of the NN algorithm) is encountered then the collected real-time sensor output data 102 associated with the new terrain type may be stored in the data memory 44 and, for example, reported back to the manufacturer so that it may be used to incorporate the new terrain type into the NN algorithm (i.e. a new possible output of the NN algorithm). Alternatively, or in addition, the real-time sensor output data 102 associated with the new terrain type may be processed directly by the on-board VCS 38 if suitable processing capability is available. The updated weights (calculated by either the manufacturer or on-board the vehicle) may be made available via a central database for use in future vehicles via software updates or over-the-air updates (for example, via a phone network, Internet, WiFi).

In the above-described embodiment, sensor output data relating to terrain ahead of the vehicle from radar and acoustic sensors is used to calculate the parameters for input to the NN algorithm. The acoustic sensors described in the above embodiments, or alternatively one or more microphones, may be used to measure sensor output data relating to gravel crunch, tyre noise, or any other suitable type of data relating to the terrain over which the vehicle is travelling, which may be used as an additional input parameter(s) to the NN algorithm. It is also mentioned above that sensor output data from one or more on-board sensors (such as a wheel speed sensor, tyre pressure sensor, vehicle speed sensor, brake pedal position sensor, suspension articulation, acceleration, wheel slip, pitch rate, and yaw rate) may also be used to calculate parameters to be input to the NN algorithm.

High frequency, high resolution radar sensors (for example, in the Terahertz range) may be used to collect sensor output data which can differentiate between the texture or roughness of different terrain types, and so may be used to calculate one or more further parameters for input into the NN algorithm.

In other embodiments, sensor output data from different types of sensors on the vehicle may be used. These include optical sensors, colour sensors, infrared sensors, ultraviolet sensors, or any other suitable sensor. For example, a colour sensor may be used to calculate a parameter based on the colour of the terrain, which could be used to distinguish between terrain types (e.g. black tarmac and green grass).

It will be appreciated by a person skilled in the art that the increase of the MLP performance may be achieved through optimisation of the neural network architecture that includes a selection of the number of layers, the number of neurons/nodes in each layer, the activation function of each layer and the training and/or calibration technique.

It will be appreciated by a person skilled in the art that the invention could be modified to take many alternative forms without departing from the scope of the appended claims.

The list below gives examples of the parameters that may be used as inputs to the neural network algorithm. Each parameter may be determined based on a received radar or acoustic signal, and for a range of frequencies and bandwidths. Note that VV refers to vertical polarisation, HH refers to horizontal polarisation, and VH and HV refer to cross polarisations (vertical to horizontal and horizontal to vertical, respectively).

VV average power
HH average power
HV (VH) average power
VV standard deviation
HH standard deviation
HV standard deviation
VH standard deviation
VV duration above a defined threshold
HH duration above a defined threshold
VH duration above a defined threshold
HV duration above a defined threshold
VV power above a defined threshold
HH power above a defined threshold
HV power above a defined threshold
VH power above a defined threshold
VV/HH relative power
VH/HH relative power
HV/HH relative power

The invention claimed is:

1. A system for use in a vehicle for determining an indication of a type of terrain ahead of the vehicle, the system comprising:
   means configured to receive sensor output data from at least one sensor on the vehicle, the sensor output data including a reflected radar signal from a terrain ahead of the vehicle;
   means configured to determine a plurality of parameters in dependence on the sensor output data;
   a neural network algorithm configured to receive the plurality of parameters; and
   means configured to execute the neural network algorithm to provide a plurality of outputs corresponding to a plurality of different terrain types, the neural network algorithm being further configured to associate the plurality of parameters with one of the plurality of outputs, so as to determine the indication of the terrain type;
   wherein the means configured to receive sensor output data includes a pair of receiving antennas at orthogonal polarisations for receiving the reflected radar signal; and
   wherein the means configured to determine the plurality of parameters in dependence on the sensor output data is configured to determine the plurality of parameters in dependence upon at least:
   (a) a cross polarisation signal power; and
   (b) at least one of received vertically polarised signal power and received horizontally polarised signal power.

2. The system according to claim 1, wherein:
   the means configured to receive comprises an electronic processor having an electrical input for receiving the sensor output data;
   an electronic memory device electrically coupled to the electronic processor and having instructions stored therein; and
   the means configured to determine and the means configured to execute comprise the electronic processor being configured to access the memory device and execute the instructions stored therein such that the electronic processor is operable to determine the plurality of parameters and to execute the neural network algorithm, so as to determine the indication of the terrain type.

3. The system according to claim 1, comprising means for storing a plurality of weighting factors, and wherein the neural network algorithm comprises a plurality of nodes, each one of the weighting factors associated with a corresponding node and each weighting factor being applied to said corresponding node when the neural network algorithm is executed.

4. The system according to claim 1, wherein the neural network algorithm is configured to determine a classification probability for each of the plurality of outputs in dependence on the plurality of parameters, and wherein the determination of the terrain type is based on the output with a highest classification probability.

5. The system according to claim 3, comprising means configured to adjust one or more of the weighting factors applied to the nodes of the neural network algorithm in dependence on the plurality of parameters, and/or one or both of the determined terrain type and a terrain type determined by a driver, as part of a self-learning process.

6. The system according to claim 1, comprising means configured to enable communication of the determined terrain type to a driver of the vehicle.

7. The system according to claim 1, comprising means configured to compare the determined terrain type with a terrain type determined by a driver, as part of a self-learning process.

8. The system according to claim 1, comprising means configured to store the plurality of parameters together with corresponding determined terrain type and/or the terrain type determined by a driver, as part of a self-learning process.

9. The system according to claim 1, comprising means configured to send the plurality of parameters, and/or one or both of the determined terrain type and the terrain type determined by a driver, to a manufacturer of the vehicle.

10. The system according to claim 1, comprising means configured to send a control signal to one or more vehicle systems or subsystems to automatically adjust a setup of at least one vehicle system or subsystem in dependence on the determined terrain type.

11. The system according to claim 1, wherein the means configured to receive is configured to receive the reflected radar signal at a plurality of radar signal frequencies.

12. The system according to claim 1, wherein the means configured to receive sensor output data is configured to receive sensor output data as at least one of:
    a received horizontally polarised signal representative of power in a received horizontal polarisation component of the radar signal reflected from the terrain ahead of the vehicle;
    a received vertically polarised signal representative of power in a received vertical polarisation component of the radar signal reflected from the terrain ahead of the vehicle;
    a power of a received clockwise-rotating elliptically polarised signal of the radar signal reflected from the terrain ahead of the vehicle; and
    a power of a received anticlockwise-rotating elliptically polarised signal of the radar signal reflected from the terrain ahead of the vehicle.

13. The system according to claim 12, wherein the plurality of determined parameters includes at least one of an average of the horizontal polarisation signal power, an average of the vertical polarisation signal power, an average of the cross polarisation signal power, a horizontal polarisation signal standard deviation, a vertical polarisation component standard deviation, a cross polarisation signal standard deviation, a vertical polarisation component standard deviation, a duration of the horizontal polarisation signal power above a defined horizontal power threshold, a duration of the vertical polarisation signal power above a defined vertical power threshold, a duration of the cross polarisation signal power above a defined vertical power threshold, the horizontal polarisation power signal, the vertical polarisation power signal, the cross polarisation power signal from a fixed area of terrain ahead of the vehicle, and a ratio of any two of (i) the horizontal polarisation power signal, (ii) the vertical polarisation power signal, and (iii) the cross polarisation power signal.

14. The system according to claim 12, wherein the means configured to receive is configured to receive sensor output data as a reflected acoustic signal from the terrain ahead of the vehicle at one or more acoustic signal frequencies, and wherein the plurality of determined parameters includes at least one of a ratio of an acoustic power signal and one of the horizontal polarisation power signal, the vertical polarisation power signal, the cross polarisation power signal, and the acoustic power signal from a fixed area of terrain ahead of the vehicle.

15. The system according to claim 1, wherein the means configured to receive is configured to receive sensor output data as a reflected acoustic signal from the terrain ahead of the vehicle at one or more acoustic signal frequencies.

16. The system according to claim 1, wherein the means configured to receive is configured to receive a signal from at least one of a wheel speed sensor, tyre pressure sensor, vehicle speed sensor, brake pedal position sensor, suspension articulation sensor, acceleration sensor, wheel slip sensor, pitch rate sensor, and yaw rate sensor.

17. A vehicle comprising the system according to claim 1.

18. A method for use in a vehicle for determining an indication of a type of terrain ahead of the vehicle, the method comprising;
    receiving sensor output data from at least one sensor on the vehicle, the sensor output data including a reflected radar signal from a terrain ahead of the vehicle, wherein the sensor output data is received via a pair of receiving antennas at orthogonal polarisations for receiving the reflected radar signal;
    calculating a plurality of parameters in dependence on the sensor output data;
    receiving the plurality of parameters into a neural network algorithm; and
    executing the neural network algorithm to provide a plurality of outputs corresponding to a plurality of different terrain types, the neural network algorithm associating the plurality of parameters with one of the plurality of outputs, so as to determine the indication of the terrain;
    wherein the plurality of parameters is determined in dependence upon at least:
        (a) a cross polarisation signal power; and
        (b) at least one of received vertically polarised signal power and received horizontally polarised signal power.

19. A non-transitory, computer-readable storage medium storing instructions thereon that when executed by one or more electronic processors causes the one or more electronic processors to carry out the method of claim 18.

* * * * *